Sept. 18, 1934.  E. D. TILLYER  1,973,966
EYE TESTING DEVICE
Filed Nov. 16, 1929
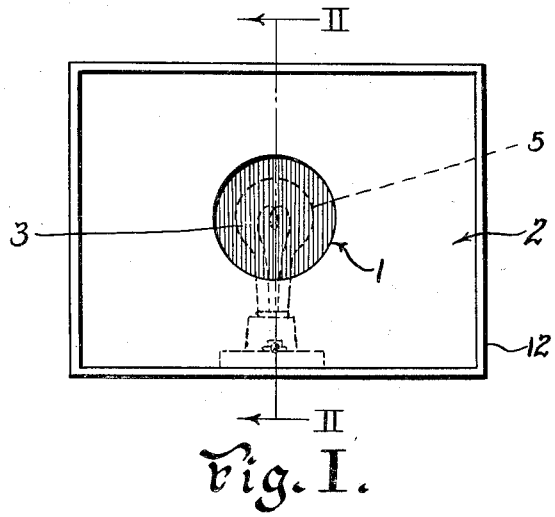
Fig. I.
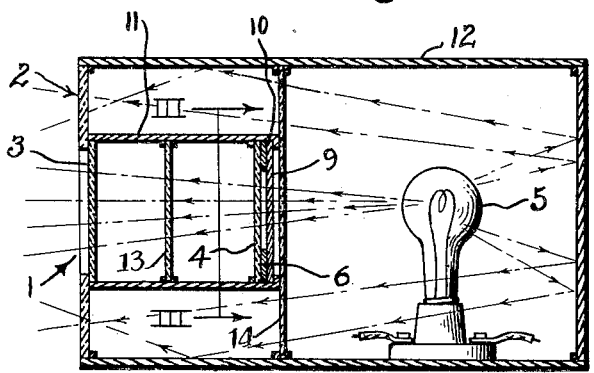
Fig. II.
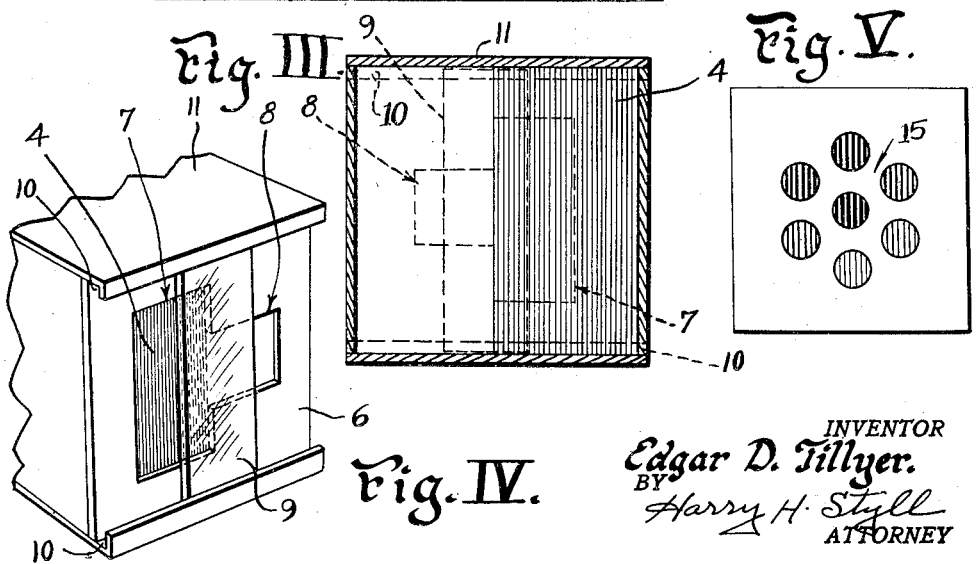
Fig. III.  Fig. V.
Fig. IV.
INVENTOR
Edgar D. Tillyer.
BY
Harry H. Styll
ATTORNEY Patented Sept. 18, 1934

1,973,966

UNITED STATES PATENT OFFICE 1,973,966

EYE TESTING DEVICE

Edgar D. Tillyer, Southbridge, Mass., assignor to American Optical Company, Southbridge, Mass., a voluntary association of Massachusetts Application November 16, 1929, Serial No. 407,680

2 Claims. (Cl. 88—20)

This invention relates to eye testing devices and has particular reference to improved means for testing and determining the color deficiencies of an eye.

The principal object of the invention is to provide improved means of increasing the accuracy, speed and ease in testing and determining the color deficiencies of an eye.

Another object is to provide improved color test means wherein the purity of the color may be varied.

Another object is to provide improved test means wherein a quicker and more accurate color test may be obtained.

Another object is to provide simple, efficient and economical means of obtaining the best possible results in color sensitivity examination.

Other objects and advantages of the invention will become apparent from the following description taken in connection with the accompanying drawing, and it will be understood that many changes may be made in the details of construction and arrangements of parts without departing from the spirit of the invention as expressed in the accompanying claims. I, therefore, do not wish to be limited to the exact details shown and described, as the preferred form only has been shown by way of illustration.

Referring to the drawing:

Fig. I is a front elevation of the device embodying the invention.

Fig. II is a cross section on line II—II of Fig. I.

Fig. III is an enlarged cross section taken on line III—III of Fig. I, looking in the direction indicated by the arrows.

Fig. IV is a rear perspective view of the cross slide arrangement shown in Fig. III.

Fig. V shows a test card having different colored test spots thereon.

In testing the color deficiencies of an eye, the usual practice was to employ different colored lanterns, strands of fabric or a chart having different colored test spots printed thereon. The test means, for example the test chart having different colored spots thereon, was placed before the eye to be tested and the patient asked to distinguish the various colors. The manner in which the patient selected or sorted out the different colors determined whether or not there were any color deficiencies present.

The intention of the test was to provide means whereby the examiner could detect the color sense lacking.

In the past, much difficulty has been encountered in determining whether or not there were any color deficiencies in the eye being tested. This was due to the fact that a color blind person could through experience select or distinguish a color accurately by a certain form or illusive effect which took place when looking at that particular color. For example, a red sensation blind person could distinguish red by a darkening effect or form which took place when looking at red. In this manner the patient could acquaint himself with the various changes that take place when looking at different colors and cause much confusion and misjudgments in the tests.

The present invention obviates this possibility by providing test means that will be entirely invisible to an eye lacking in the color sense being tested. The invisibility of the test spot dispenses with any possible distinction of color through forms or illusive effects as in the past.

Referring more particularly to the drawing wherein like characters of reference designate like parts throughout, the invention comprises placing a test spot 1, say of red, on a gray back field 2. The red spot 1 being of an intensity which has been increased over the intensity of the gray back field 2 an amount sufficient to cause the red to appear to a red sensation blind eye as being of the same visual intensity as the gray. The red spot 1 in this instance will not be visible to a red sensation blind eye because the calculated intensity of the red causes the test spot to appear gray, the result of which is that the spot 1 blends with and disappears into the gray of the back field 2. This dispenses with the difficulties and confusions stated above.

The test spot in this instance is in the form of a transparent screen 3 placed in the center of a transparent gray back field 2. The color of the spot 1 is projected on the screen 3 by means of a colored slide 4 which is interposed between the screen 3 and an electric lamp or similar source of illumination 5. The purity of the color on the spot 1 is controlled by making the slide 4 in two sections, one of the color desired and the other a plain white as illustrated in Figs. III and IV.

An opaque member 6 having its central portion cut away to form different sized openings 7 and 8 is placed over the color slide 4 to permit only a calculated amount of light to pass through each of the two sections. This varying of the light passing through the two sections effectively changes the white to a gray and provides means for varying the gray mixture with the test color so the purity and intensity of said test color may be varied as desired.

Additional means for varying the intensity of the light is provided by placing an opaque slide 9 in a slide way 10 formed in the projector housing or color slide support 11. The slide plate 9 is adapted to be moved longitudinally of the slide 10, as illustrated in Fig. IV, to increase or decrease the ratio of the two colors by allowing more light to pass through one section than the other. This determines the intensity of the color projected on the screen 3. The light from the lamp 5 is also adapted to illuminate the gray of the back field 2 to a predetermined intensity. A suitable casing 12 forms a support and protector for the various parts of the device and also acts as a reflector to reflect light through the transparent test fields 1 and 2. The inside of the casing 12 may be provided with a polished reflective surface or may be lined or painted with any means having reflective properties suitable to produce the desired results. One of the side walls of the casing 12 is removable to gain access to the interior of the casing to permit adjustment of the plate 9. Diffusing screens 13 and 14 are employed to provide a uniform distribution of light through the test fields 1 and 2.

The openings 7 and 8 may be made adjustable if desired to give a different ratio for different totals of color projected.

It is to be understood that the red color used throughout the description is only as a means of illustration and that any color, such as green, yellow or blue, may be varied in intensity to obtain the same result.

The test device may also be in the form of a test card or like means such as shown in Fig. V having different colored test spots 15 of calculated variances in intensity printed thereon. In this type test chart a test spot say of red could be surrounded by additional spots of red of varying intensities wherein the amount of deficiency in that particular color could be obtained through judgments made by the patient. The same applies to any color employed.

Although the preferred form of test chart has been shown and described as having the spot 1 projected on a screen 3, it is apparent that the spot 1 could be projected on the transparent gray field 2 equally as well. In this instance the color would have to be calculated in intensity and purity so that it would give the desired results.

The test made with the improved device is very quick and definite by reason of the fact that when a test spot, say of red, is placed before an eye lacking in that particular color sense it will appear gray and blend with and disappear into the gray of the back field 2.

In making the test the examiner simply places the color to be tested before the eye. The patient is then asked if there is a color spot present. If the eye being examined lacks the color sense being tested the patient will see no spot. If it is normal the patient will simply state that he does see a spot. It is not necessary that he state the color present as the examiner immediately knows that it must be the color being tested or the patient would not see the spot. This lends much ease and certainty in making the test.

From the foregoing description it will be seen that I have provided simple, accurate and efficient means of obtaining the color deficiencies of an eye.

Having described my invention, I claim:

1. In an eye testing device, a test chart comprising one part of a neutral color and given visual intensity and a second part of a test color within the limits of the first part and means for varying the intensity and purity of the color of the second part an amount sufficient to cause it to appear to an eye under test and lacking in the color sense of the test color as being of the same visual intensity as the neutral color whereby the said test color will blend with said neutral color and become non-image forming and invisible, and to an eye under test and normal as to the color sense of said test color it will appear as being a color difference on the neutral background.

2. In an eye testing device, a test chart comprising one part of a neutral color and given visual intensity and a second part of a test color within the limits of the first part and having means associated therewith for varying the intensity and purity of the color of the second part an amount sufficient to cause it to appear to an eye under test and lacking in the color sense of the test color as being of the same visual intensity as the neutral color whereby the said test color will blend with said neutral color and become non-image forming and invisible, and to an eye under test and normal as to the color sense of said test color it will appear as being a color difference on the neutral background.

EDGAR D. TILLYER.